April 5, 1938.  H. RAABER  2,113,199

BOMB SIGHT

Filed Sept. 28, 1934

Inventor:
Hans Raaber,
By E. F. Wendroth
Atty

Patented Apr. 5, 1938

2,113,199

UNITED STATES PATENT OFFICE 2,113,199

BOMB SIGHT

Hans Raaber, Purkersdorff, near Vienna, Austria, assignor to Actiengesellschaft C. P. Goerz Optische Anstalt Actiova Spolecnost K. P. Goerz opticky ustav, Bratislava, Czechoslovakia, a company of Czechoslovakia Application September 28, 1934, Serial No. 746,021
In Germany October 6, 1933

6 Claims. (Cl. 33—46.5)

The invention has for its object to provide an apparatus for determining the range angle for releasing or dropping missiles from aircrafts and for adjusting certain parts in accordance with said angle.

With this object in view the present apparatus comprises an aiming device the upper sight mark of which is adjusted relatively to a horizontal line in accordance with the falling time of the missile dependent of the linear altitude of the aircraft above the level of the target. On said horizontal line a measured length may be adjusted at will whereupon a triangle is mechanically reproduced which if, as I prefer, the trail, i. e., the horizontal component of the movement of the missile due to the resistance of air is taken into account, is approximately rectangular. One side of this triangle is equal or proportional to said measured length while one of the two other sides of said triangle is inclined to the first named side of a right angle and preferably at a right angle plus the range angle, its length being proportional to the measuring time taken at the scale of adjusting the upper sight mark in accordance with the falling time, that is to say, proportional to the time required for the apparent movement of the target over the distance measured. The angle between the direction of the third side of the triangle, then resulting, then gives the range angle or the angle complementary thereto.

Figure 1:
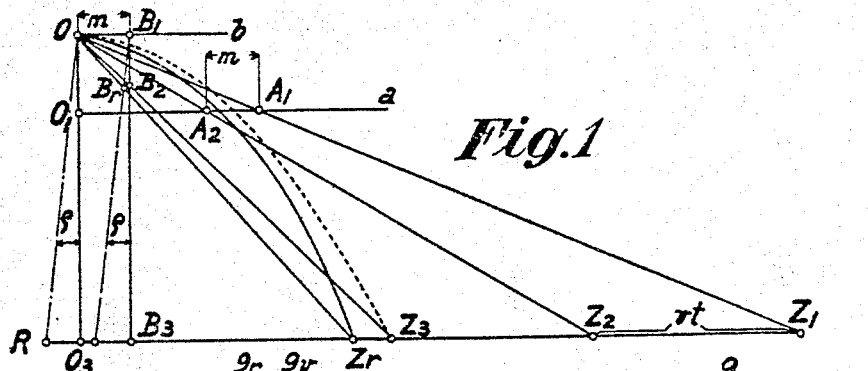
Figures 2, 3:
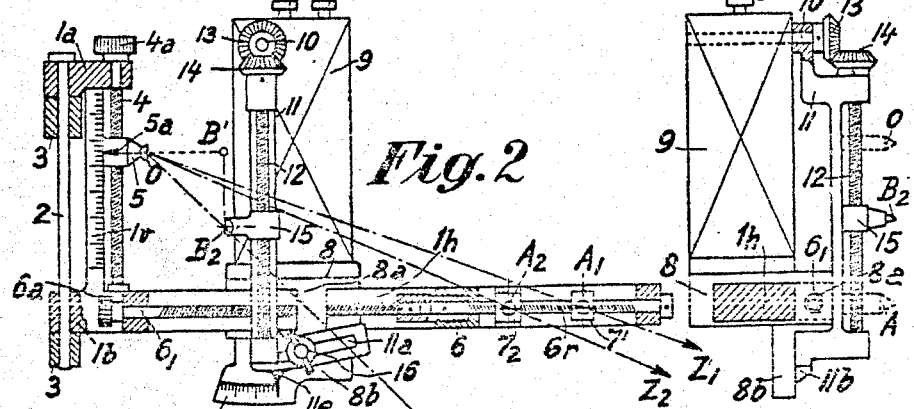
Figure 4:
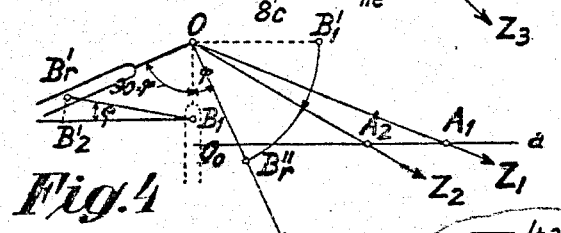
Figure 5:
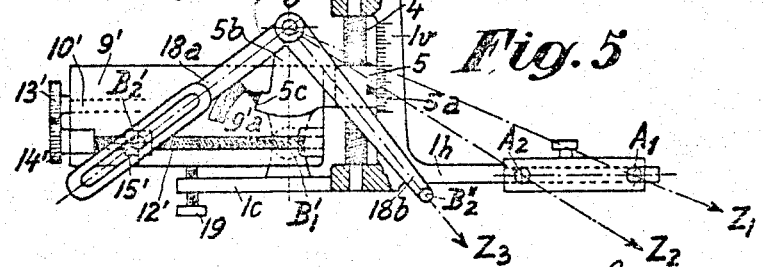

The accompanying drawing illustrates by way of example two constructional forms of the present apparatus. Fig. 1 illustrates the mechanical principle of the aiming device, Fig. 2 is a side elevation of the aiming device based on the principle illustrated in Fig. 1, the adjusting screw spindle of the releasing or dropping sight mark being vertical. Fig. 3 is a rear elevation of the device shown in Fig. 2. Fig. 4 illustrates the mechanical principle of the aiming device, the adjusting screw spindle of the releasing or dropping sight mark being horizontal. Fig. 5 is a side elevation of a simplified device with an invariable measuring distance.

In Fig. 1 the point O is an upper sighting mark at a distance $h = OO_1 = ct$ above the horizontal line $O_1-a$ which distance is proportional to the falling time $T$ of the missile. There is a lower sight mark adjustable at will on the line $O_1-a$ in the direction of flight or in the reverse direction, and which for example may be adjusted to position $A_1$ or position $A_2$. If now $A_1A_2 = m$ is the distance selected, the measuring of the speed $v$ of flight, or in other words the speed of the approaching target begins at the moment when the target—being at a distance $H = OO_3$ below the aircraft—appears at $Z_1$ in the first preliminary sight line and ends at the time $t$, when the target appears in the second sight line $OA_2$ in the point $Z_2$. If in the horizontal line $O-b$ a point $B_1$ is so selected that $OB_1 = A_1A_2 = m$ and if the point $B_1$ is moved vertically downwards from the beginning of measuring with a constant speed $$c = \frac{h}{T}$$

—the trail being neglected—then this point will arrive at the end of the measuring time $t$ at $B_2$ and $B_1B_2 = ct$.

The angle $OB_2B_1 = \phi$ is defined by the equation $$tg\phi = \frac{OB_1}{B_1B_2} = \frac{m}{ct}$$

Now from the similar triangles $OA_1A_2 \sim OZ_1Z_2$ it follows $h:H = A_1A_2:Z_1Z_2 = m:v.t$ and consequently $$\frac{c.t}{H} = \frac{m}{vt} \text{ or } \frac{vt}{H} = \frac{m}{ct} = \tan \phi$$

Now $$\frac{vT}{H}$$

is simply the tangent of the range angle so that the angle $OB_2B_1 = \phi = Z_3OO_3$ is the range angle sought and $OB_2Z_3$ is the releasing or dropping sight line. For taking into account the trail angle $\rho = O_3OR$ the direction of movement of the point $B_1$ would have to be at this angle to the vertical but turned backwards in order that the missile to be released may hit the point $Z_r$ which is in rear of the point $Z_3$ that would be hit in the absence of trail, being $Z_3Z_r = O_3R$.

The apparatus illustrated in Figs. 2 and 3 and based on the above explained principle comprises a frame composed of two arms $l_v l_h$ perpendicular to each other journalled in bracket 3 on the side wall of the aircraft by a hinge bolt 2 passing through the eyelets $l_a$, $l_b$ on said frame. A vertical screw spindle 4 is rotatably mounted on the vertical arm $l_v$ and a nut 5 locked against rotation is mounted on the screw spindle, is provided with a mark $5_a$ serving for adjustment and moves along a scale on the arm $l_v$ indicating falling time so that the nut 5 may be adjusted to any falling time.

On the horizontal arm are rotatably mounted two coaxial screw spindles $6_l$, $6_r$ connected by a clutch 6. On turning these screw spindles in the first place the nut carrying the preliminary sight and locked against rotation on the right handed screw spindle $6_r$ may be adjusted axially while at the same time the slide 8 movable along the horizontal arm $l_h$ of the frame and connected with the nut $8_a$ mounted on the left handed screw spindle $6_l$ moves to the same extent but in the opposite direction. The slide 8 carries a clockwork 9 rotating a shaft 10 with constant speed in the one or in the other direction according to whether the button $9_v$ or $9_r$ is pushed. On this shaft 10 is idly mounted a vertical arm 11 in which is journalled a screw spindle 12 serving as the adjusting spindle of the release or dropping sight mark. Moreover a bevel pinion 13 is fast on the end of the shaft 10 and engages into a bevel pinion 14 fast on the screw spindle 12. On the screw spindle 12 is mounted and locked against rotation a nut 15 carrying the releasing sight $B_2$. In the lug $8_b$ on the slide 8 a clamping screw 16 is secured which engages into a slot $11_a$ concentric to the shaft 10 so that by tightening the thumb nut the arm provided with the adjusting mark may be so clamped in position that the screw spindle 12 may be inclined to the vertical by an angle equal to the trail angle.

The operation of the device is the following:
Prior to the beginning of measuring the sighting mark O carried by the nut 5 is adjusted in accordance with the falling time T of the missile by turning the knob $4_a$ with the aid of the adjusting mark $5_a$ and the scale on the arm $l_v$. Also the inclination of the screw spindle 12 is adjusted in accordance with the trail angle. Then on the one hand by turning the knob $6_a$ and by throwing into operation the clockwork the mark $B_2$ is moved to a position vertically beneath the sighting mark O, the nut 7 on the screw spindle $6_a$ and the preliminary sighting mark carried thereby being brought into the position $A_1$. If it is desired to select at will the position of the sight mark the clutch 6 can be constructed so that the screw spindle $6_r$ can be shifted without rotation and can be subsequently locked in position. Such constructions are conventional per se, as in drafting instruments. The aircraft then flies towards the target in an exactly horizontal direction and the apparatus is so turned relatively to the wall of the aircraft that the target may come into the preliminary sight line, even in the case of drift. At the moment it does so the button $9_v$ is actuated, thereby starting shaft 10 of the clockwork to revolve in the forward direction. Thereby the nut 15 and the releasing sight mark $B_2$ is moved downwards. If because of clouds or for any other reason the target cannot be properly sighted at $Z_2$, then after beginning of the measurements the nut 7 is shifted to the left through any desired distance by turning the knob $6_a$ until the target appears in the sighting line $OA_2$. In this shifting movement the slide 8, together with the nut 15 and the mark $B_2$, is moved forward, so that by this operation the distance $A_1A_2$ has been increased, although the point $A_1$, which is no longer required has moved along with $A_2$. At the moment when the target appears in the sighting line $OA_2$ the clockwork is stopped by pressing the button $9_r$. Thus the nut 15 and the dropping sight mark $B_2$ are in such a position that the sight line $OB_2$ makes with the vertical the range angle $\phi$ required for hitting the target.

This aiming device becomes much simpler if a constant measuring distance is used. Then the two screw spindles $6_r$ and $6_l$ may be dispensed with together with their actuating knob and their clutch 6 and the slide 8. Instead thereof two preliminary sighting marks $A_1A_2$ are provided on the horizontal arm $l_h$ of the frame in a properly selected distance from each other while the clockwork 9 is so arranged on this arm $l_h$ that the horizontal distance between the sight marks O and B is equal to the distance between the sight marks $A_1$ and $A_2$. The two sighting marks may then be arranged on a slide directly moved by hand along the horizontal arm $l_h$ in order to enable the first preliminary sighting direction to be selected at will, independent of the falling time, that is to say, the vertical distance between the sighting mark O and the measuring line $A_1A_2$.

The operation of the simplified apparatus is simpler than that of the apparatus hereinbefore described, in so far that after starting the clockwork shaft at the moment of the coincidence of the target with the first preliminary sighting line $OA_1$ no further actuation is required except the throwing out of operation of the clockwork shaft 10 at the moment of coincidence of the second preliminary sighting line $OB_2$ with the target.

In Fig. 5 is illustrated such a simplified apparatus with a slight modification of the mechanical arrangement which is diagrammatically shown in Fig. 4. There again O is the upper sighting mark formed by the axial extension of a horizontal pin secured in a bracket $5_b$ forming part of the nut 5. The same as in Fig. 1 this nut is mounted on a screw spindle 4, is locked against rotation and is guided on the vertical arm $l_v$ provided with the scale for the falling time. On this scale the height of the sighting mark O above the measuring distance $A_1A_2$ may be adjusted with the aid of the adjusting mark $5_a$. The measuring distance $A_1A_2$ is represented by the two preliminary sighting marks $A_1$ and $A_2$ fast in a slide freely movable along the horizontal arm $l_h$ and adapted to be locked in position. The bracket $5_b$ on the nut 5 carries at $B_1'$ a horizontal trunnion on which the clockwork casing $9'$ is journalled, $OB_1'$ being equal to $A_1A_2$. The reversible clockwork shaft $10'$ revolving at a constant speed may be thrown into and out of operation in the same manner as the shaft 10 in Figs. 2 and 3 and transmits its revolution by the spur wheels $13'$, $14'$ to the horizontal screw spindle $12'$ serving as the adjusting spindle of the releasing sight mark. On this screw spindle is mounted a prismatic nut carrying a trunnion $B_2'$ engaging into a slot of an arm $18_a$ of a rectangular toggle lever pivoted at O; the other arm $18_b$ of this lever carries the dropping mark $B_2''$. The range angle $\phi$ is in this case the angle $B_1'OB_2''$ complementary to the angle $B_2'OB_1'$ and is thus transmitted. This angle $B_2'OB_1'$ is the opposite angle of the measuring triangle of even name which is formed when at the beginning of the measuring time, when $Z_1$ is in the first preliminary sighting line $OA_1$, the centre of the pin $B_2'$ was in $OB_1'$ so that after the expiration of the measuring time $t$ owing to the rotation of the clockwork shaft $10'$ having taken place during this time has arrived in the position $B_2$ shown, neglecting, however, trail. For taking into account the trail the clockwork $9'$ pivoted on $B_1'$ would have to be so turned by turning the screw 19 in the arm $l_c$ of the frame, until the adjusting spindle $12'$ makes the trail angle with the horizontal. The scale $9_a'$ and pointer on bracket $5_b$ serves for this purpose. In this case too the rectangular frame $l_v$ $l_h$ must be pivoted to the side wall of the aircraft, the same as in the constructional form shown in Figs. 2 and 3.

Finally it is observed that the distance $OB_1$ may be greater or less than $A_1A_2$ or in other words $OB_1$ may be $k.A_1A_2$, so that in the case of Figs. 2 and 3 the pitches $a_1$, $a_r$ of the two screw spindles $6_1$, $6_r$ would also be in the ratio $k$. But then the speed of the clockwork must be so controlled that $$B_1B_2 = k.ct \text{ if } c \text{ were equal to } \frac{OO_1}{T}$$

What I claim is:

1. An apparatus for determining the range angle for releasing missiles from aircrafts, comprising a frame, a first substantially vertical screw spindle mounted on said frame, a first nut threaded on said first screw spindle and locked against rotation therewith, a sighting mark carried by said first nut and movable along said first screw spindle as said spindle is rotated, two preliminary sighting marks on said frame, means for moving said preliminary sighting marks horizontally along said frame a fixed distance from each other, a clockwork slidable on said frame, a second substantially vertical screw spindle on said clockwork, a second nut threaded on said second screw spindle and locked against rotation therewith, a release sighting mark connected with said second nut, and means including said clockwork for revolving said second screw spindle for a certain time as determined by said two preliminary sighting marks at a constant angular speed, whereby after the expiration of said time said first-named sighting mark and said release sighting mark operate to indicate the angle sought.

2. An apparatus for determining the range angle for releasing missiles from aircrafts, comprising a frame, a first substantially vertical screw spindle mounted on said frame, a first nut threaded on said first screw spindle and locked against rotation therewith, a sighting mark carried by said first nut and movable along said first screw spindle as said spindle is rotated, two preliminary sighting marks on said frame, a slide mounted on and movable along said frame, a clockwork mounted on said slide, a second substantially vertical screw spindle on said clockwork, means for holding said second screw spindle inclined to the vertical by the trail angle, a second nut threaded on said second screw spindle and locked against rotation therewith, a release sighting mark connected with said second nut, means including said clockwork for revolving said second screw spindle for a certain time as determined by said two preliminary sighting marks at a constant angular speed, whereby after the expiration of said time said first-named sighting mark and said release sighting mark cooperate to indicate the angle sought.

3. An apparatus for determining the range angle for releasing missiles from aircrafts, comprising a frame, a first substantially vertical screw spindle mounted on said frame, a first nut threaded on said first screw spindle and locked against rotation therewith, a sighting mark carried by said first nut and movable along said first screw spindle as said spindle is rotated, two preliminary sighting marks on said frame, a clockwork slidable on said frame, a second screw spindle on said clockwork, a second nut threaded on said second screw spindle and locked against rotation therewith, means operatively interconnecting said second nut and said release sighting mark so that the latter is controlled by said second nut, and means including said clockwork for revolving said second screw spindle for a certain time as determined by said two preliminary sighting marks at a constant angular speed, whereby after the expiration of said time said first-named sighting mark and said release sighting mark cooperate to indicate the angle sought.

4. An apparatus for determining the range angle for releasing missiles from aircrafts, comprising a frame, a first substantially vertical screw spindle mounted on said frame, a first nut threaded on said first screw spindle and locked against rotation therewith, a first sighting mark carried by said first nut and movable along said first screw spindle as said spindle is rotated, a slide, means for moving said slide horizontally along said frame, a preliminary sighting mark on said frame, a second sighting mark, means for moving said second sighting mark horizontally along said frame in a direction opposite to the movement of said slide but to the same extent thereof, a clockwork on said slide, a second substantially vertical screw spindle on said slide, means whereby said clockwork rotates said second spindle, a second nut threaded on said second screw spindle and locked against rotation therewith, a release sighting mark connected with said second nut, and means including said clockwork for revolving said second screw spindle for a certain time as determined by said two preliminary sighting marks at a constant angular speed, whereby after the expiration of said time said first-named sighting mark and said release sighting mark cooperate to indicate the angle sought.

5. An apparatus for determining the range angle for releasing missiles from aircrafts, comprising a frame, a first substantially vertical screw spindle mounted on said frame, a first nut threaded on said first screw, two horizontal coaxial second and third screw spindles one of which is right-hand threaded and the other left-hand threaded, a second nut threaded on one of these coaxial screw spindles, and locked against rotation therewith, a slide secured on said second nut, a third nut threaded on the other of said coaxial spindles and locked against rotation therewith, a second sighting mark on said third nut, a clockwork and a fourth substantially vertical screw spindle, both mounted on said frame, a fourth nut threaded on said fourth screw spindle and locked against rotation therewith, a release sighting mark connected with said fourth nut, and means including said clockwork for revolving said fourth screw spindle for a certain time as determined by said slide and said second sighting mark at a constant angular speed, whereby after the expiration of said time said first-named sighting mark and said release sighting mark cooperate to indicate the angle sought.

6. An apparatus for determining the range angle for releasing missiles from aircrafts, comprising a frame, a first substantially vertical screw spindle mounted on said frame, a first nut threaded on said first screw, two horizontal coaxial second and third screw spindles on said frame, one of which is right-hand threaded and the other left-hand threaded, a second nut threaded on the one of these coaxial screw spindles, and locked against rotation therewith, a slide secured on said second nut, a third nut threaded on the other of these coaxial screw spindles and locked against rotation therewith, a sighting mark on said third nut, a clockwork on said slide, a fourth screw spindle pivotally affixed to said slide to swing in the vertical plane of the target and operatively connected with said clockwork, a fourth nut threaded on said fourth screw spindle and locked against rotation therewith, a release sighting mark connected with said fourth nut, and means including said clockwork for revolving said fourth screw spindle for a certain time as determined by said slide and said second sighting mark at a constant angular speed, whereby after the expiration of said time said first-named sighting mark and said release sighting mark cooperate to indicate the angle sought.

HANS RAABER.